(12) United States Patent
Venczel et al.

(10) Patent No.: US 12,525,776 B2
(45) Date of Patent: Jan. 13, 2026

(54) COMPOSITE WORM GEAR FOR COVER

(71) Applicant: Hubbell Incorporated, Shelton, CT (US)

(72) Inventors: Scott Ryan Venczel, Knoxville, TN (US); Zach Kane Timm, Athens, TN (US); Jacob Brett Murrell, Maryville, TN (US); John T. Polk, III, Townsend, TN (US)

(73) Assignee: Hubbell Incorporated, Shelton, CT (US)

( * ) Notice: Subject to any disclaimer, the term of this patent is extended or adjusted under 35 U.S.C. 154(b) by 36 days.

(21) Appl. No.: 18/735,604

(22) Filed: Jun. 6, 2024

(65) Prior Publication Data

US 2024/0413624 A1 Dec. 12, 2024

Related U.S. Application Data

(60) Provisional application No. 63/507,249, filed on Jun. 9, 2023.

(51) Int. Cl.
*H02G 3/14* (2006.01)
(52) U.S. Cl.
CPC .................................... *H02G 3/14* (2013.01)
(58) Field of Classification Search
CPC .............................. H02G 3/14; E05B 65/0075
USPC .......................................................... 292/51
See application file for complete search history.

(56) References Cited

U.S. PATENT DOCUMENTS

| | | | | |
|---|---|---|---|---|
| 4,048,766 A | * | 9/1977 | Dantzer | E04F 19/08 137/364 |
| 4,723,866 A | * | 2/1988 | McCauley | E02D 29/1427 411/397 |
| 5,697,729 A | * | 12/1997 | Bowman | E02D 29/1427 404/25 |
| 6,035,581 A | * | 3/2000 | McCoy | E02D 29/1427 404/25 |
| 7,619,878 B1 | * | 11/2009 | Cook | G01F 15/063 361/679.01 |
| 8,375,551 B2 | * | 2/2013 | Flood, Jr. | E02D 29/14 29/451 |
| 9,350,148 B2 | * | 5/2016 | Emanuel | G01F 15/14 |
| 9,663,973 B2 | * | 5/2017 | Foster | E05B 35/008 |

(Continued)

FOREIGN PATENT DOCUMENTS

GB          380160 A  *  9/1932  ............. E05C 3/042

OTHER PUBLICATIONS

PCT/US2024/032732 International Search Report and Written Opinion dated Nov. 13, 2024.

*Primary Examiner* — Nathan Cumar
(74) *Attorney, Agent, or Firm* — Robinson + Cole LLP

(57) ABSTRACT

A fastener includes a bolt, a worm gear, and a retainer. A bolt shaft has a connecting region proximate to a free end of the shaft. The worm gear has a body with an upper surface, a lower surface, and an aperture that receives the bolt. The worm gear also includes a helical portion on an outer surface of the body. The retainer connects to the connecting region to retain the bolt within the aperture. The fastener can rotate relative to a cover to move from an unlocked position to a locked position where the helical portion engages the flange and limits translational movement of the cover relative to the flange. The body is tapered between the upper and lower surfaces.

20 Claims, 22 Drawing Sheets

(56) References Cited

U.S. PATENT DOCUMENTS

| | | | |
|---|---|---|---|
| 9,863,115 B2* | 1/2018 | Stadler | E02D 29/1427 |
| 2003/0178425 A1* | 9/2003 | McKinnon | H02G 3/14 |
| | | | 220/254.3 |
| 2009/0180832 A1* | 7/2009 | Vrondran | E02D 29/1427 |
| | | | 404/25 |
| 2009/0211170 A1* | 8/2009 | Burlando | E02D 29/14 |
| | | | 52/21 |
| 2019/0063032 A1* | 2/2019 | Heston | E02D 29/1427 |
| 2019/0131782 A1* | 5/2019 | Sylvester | H01R 13/447 |
| 2023/0112581 A1* | 4/2023 | Branch | F16B 37/065 |
| | | | 411/360 |

* cited by examiner

COMPOSITE WORM GEAR FOR COVER

CROSS-REFERENCE TO RELATED APPLICATION

This application claims the benefit of U.S. Provisional Application No. 63/507,249, filed Jun. 9, 2023, the entire contents of which is hereby incorporated by reference in its entirety.

FIELD

The present disclosure relates to a mechanical fastener. More particularly, the present disclosure relates to a worm gear for securing a cover.

BACKGROUND

Utility covers are used to enclose a volume that houses utility components (e.g., water meters). The utility covers are designed to be secured over the opening to limit tampering. Typically, fasteners, like worm gears, are used to secure a utility cover to a ledge around the opening to limit unwanted access.

These worm gears are typically constructed from a metal and manufactured for a specific size cover or ledge. For example, the worm gear may be manufactured at a different size based in part on the width of the ledge and the position of the worm gear when connected to the cover. A ledge with a smaller width and worm gear positioned further from an edge of the cover, the outer width of the worm gear may need to be larger in order to engage to the ledge.

While components constructed from metallic materials may have enough strength to prevent failure, the factor of safety for securing utility covers with metallic parts may be unnecessarily large. For example, workers may infrequently remove utility covers and cycling of the worm gear (e.g., between a locked and unlocked position) may be low. Therefore, many years may pass before the worm gear has reached enough cycles to achieve failure.

Additionally, metallic materials are expensive and can be difficult to manufacture. For example, a metallic part may need to be precisely machined to meet specific tolerances for the ledge or the cover.

SUMMARY

Various examples of the present disclosure can overcome various of the aforementioned and other disadvantages associated with known worm gears and offer new advantages as well.

According to one aspect of various examples of the present disclosure there is provided a fastener constructed from a non-metallic material.

According to another aspect of various examples of the present disclosure there is provided a fastener including a worm gear intended to be used with a variety of flange sizes to couple a cover to the flange and enclose a volume.

According to another aspect of various examples of the present disclosure there is provided a tapered worm gear for securing a utility cover over an opening wherein the tapered shape allows the worm gear to be used among different sized covers and openings.

According to another aspect of various examples of the present disclosure, there is provided a utility enclosure comprising a flange, a cover, a fastener, and a lock. The flange has an opening and a ledge disposed within the opening. The cover is selectively positioned at least partially within the opening and configured to contact the ledge. The fastener is configured to selectively connect the cover to the flange and includes a bolt, a worm gear, and a retainer. The bolt has a head and a shaft that extends from the head. The shaft includes a connecting region proximate to a free end of the shaft. The worm gear has a body that includes an upper surface, a lower surface, and an aperture extending through the body between the upper surface and the lower surface. The aperture is configured to receive the shaft. The worm gear also includes a helical portion on an outer surface of the body that extends at least partially between the upper surface and the lower surface. The retainer is selectively connected to the connecting region and configured to retain the bolt within the aperture. The fastener is configured to rotate relative to the cover to move from an unlocked position to a locked position. The body is tapered between the upper surface and the lower surface.

According to another aspect of various examples of the present disclosure, there is provided a fastener for retaining a cover to a flange and enclosing a utility meter. The fastener includes a bolt, a worm gear, and a retainer. The bolt is constructed from a first non-metallic material and has a head and a shaft that extends from the head. The shaft has a non-symmetrical shape and includes a connecting region proximate to a free end of the shaft. The worm gear has a body constructed from a second non-metallic material. The body has an upper surface, a lower surface, and an aperture that extends through the body between the upper surface and the lower surface. The aperture has a non-symmetrical shape complementary to the non-symmetrical shape of the bolt that receives the shaft. The worm gear also includes a helical portion on an outer surface of the body that extends at least partially between the upper surface and the lower surface. The retainer is selectively connected to the connecting region and is configured to retain the bolt within the aperture. The fastener can rotate relative to the cover to move from an unlocked position to a locked position. The body is tapered between the upper surface and the lower surface.

According to another aspect of various examples of the present disclosure, there is provided a fastener for retaining a cover to a flange and enclosing a utility meter. The fastener includes a bolt, a worm gear, and a retainer. The bolt is constructed from a first non-metallic material and has a head and a shaft that extends from the head. The shaft has a non-symmetrical shape and includes a connecting region proximate to a free end of the shaft. The worm gear has a body constructed from a second non-metallic material. The body has an upper surface, a lower surface, and an aperture that extends through the body between the upper surface and the lower surface. The aperture has a non-symmetrical shape complementary to the non-symmetrical shape of the bolt that receives the shaft. The worm gear also includes a helical portion on an outer surface of the body that extends at least partially between the upper surface and the lower surface. The retainer is selectively connected to the connecting region and is configured to retain the bolt within the aperture. An outer surface of the body is tapered between the upper surface and the lower surface. A wall of the aperture is tapered between the upper surface and the lower surface.

According to another aspect of various examples of the present disclosure, there is provided a method of forming an enclosure for a utility, the method including selecting a cover from a plurality of covers, wherein the selected cover is sized and shaped to fit within an opening of a corresponding flange; positioning a shaft of a bolt through a cover opening of the selected cover; connecting a non-metallic worm gear to the shaft of the bolt, the worm gear including a helical portion extending from the body of the worm gear, and the body of the worm gear being tapered and including a larger width proximate to the cover when connected to the bolt; selecting a retaining device from among a plurality of first retainers and a plurality of second retainers, each of the plurality of first retainer configured to be inserted through a bore of the shaft and each of the plurality of second retainers configured to be positioned in a groove of the shaft; connecting the selected retaining device to the shaft of the bolt to retain the worm gear along the shaft; positioning the selected cover at least partially within the opening of the flange to enclose a volume, the flange including a ledge for supporting the cover; and rotating the bolt and causing the worm gear to move from an unlocked position to a locked position; wherein the taper of the body permits the worm gear to interface with the ledge in the locked position with any of the plurality of covers and corresponding flanges.

According to another aspect of various examples of the present disclosure, there is provided a method of forming an enclosure for a utility, the method including selecting a cover from a plurality of covers, wherein the selected cover is sized and shaped to fit within an opening of a corresponding flange; positioning a shaft of a bolt through a cover opening of the selected cover; connecting a non-metallic worm gear to the shaft of the bolt, the worm gear including a helical portion extending from the body of the worm gear; selecting a retaining device from among a plurality of differently shaped retaining devices; connecting the selected retaining device to a free end of the shaft of the bolt to retain the worm gear along the shaft; positioning the selected cover at least partially within the opening of the flange to enclose a volume, the flange including a ledge for supporting the cover; and rotating the bolt and causing the worm gear to move from an unlocked position to a locked position.

The disclosure herein should become evident to a person of ordinary skill in the art given the following enabling description and drawings. The drawings are for illustration purposes only and are not drawn to scale unless otherwise indicated. The drawings are not intended to limit the scope of the disclosure. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompany drawing wherein.

DETAILED DESCRIPTION

As shown in FIGS. 1 to 5, an enclosure 100 includes a cover 105 that is positioned over an opening 110 in a flange 115 to at least partially enclose a volume of the flange 115. In some forms, the enclosure 100 may be for enclosing a utility meter located within the volume of the flange 115.

The cover 105 and the opening 110 may have complementary shapes to allow the cover 105 to be at least partially received within the opening 110. In the illustrated form, the cover 105 and the opening 110 may have a substantially circular shape. In other examples, the cover 105 and the opening 110 may be another shape (e.g., elliptical, rectangular, etc.).

Figure 1:
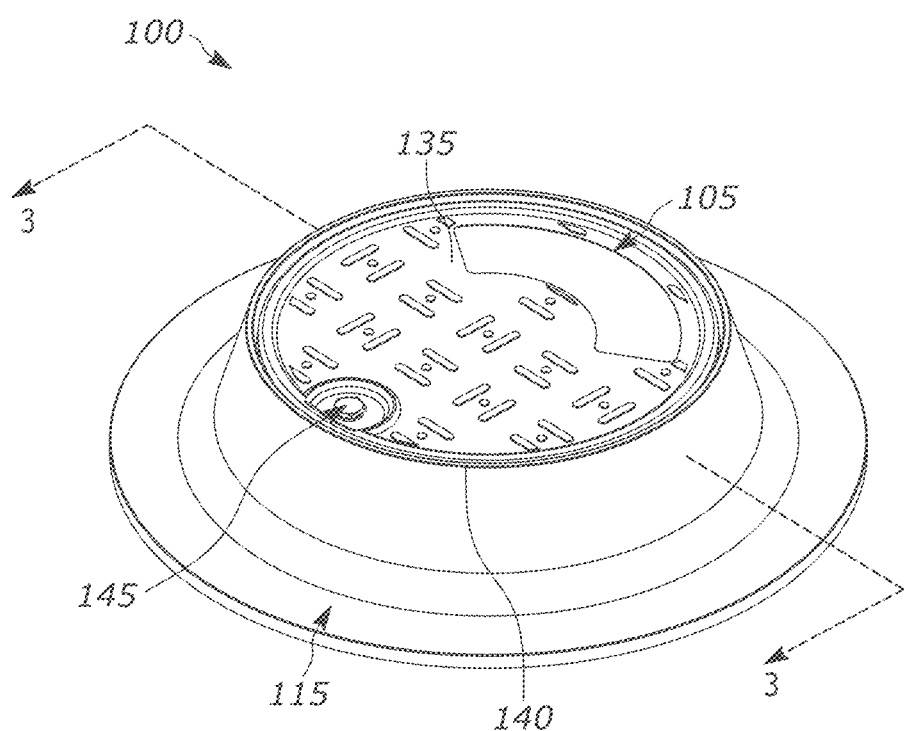
FIG. 1 is a perspective view of an enclosure that includes a cover secured to a flange using a fastener.
Figure 2:
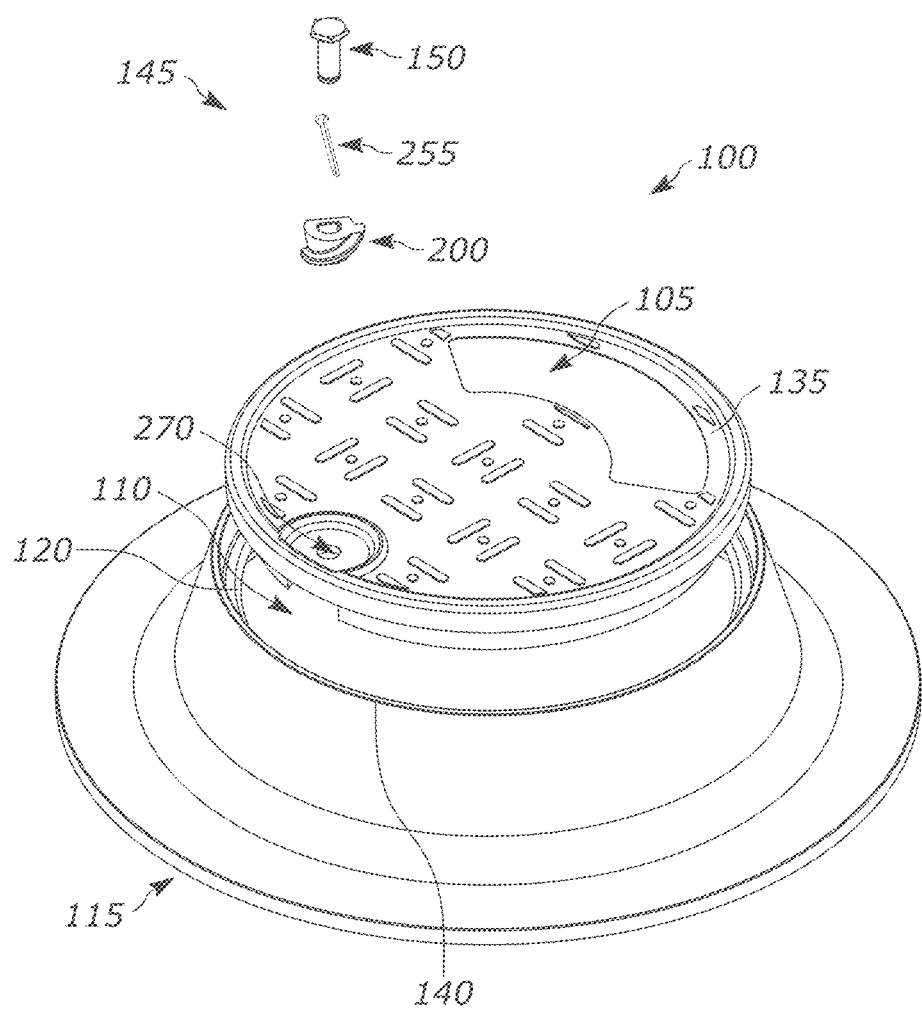
FIG. 2 is an exploded view of the enclosure of FIG. 1.

As shown in FIG. 2, a ledge 120 may be spaced apart from the opening 110 within the flange 115. The illustrated ledge 120 may extend entirely around an inner perimeter of the flange 115, although other examples of the ledge 120 may only extend partially around the inner perimeter of the flange 115. The ledge 120 may extend toward a center of the opening 110.

The ledge 120 may extend only partially in the radial direction from an inner perimeter of the flange 115. For example, a center of the interior of the flange 115 may be open. The inner diameter of the ledge 120 may be smaller than the inner diameter of the surrounding portions of the flange 115.

Figure 6:
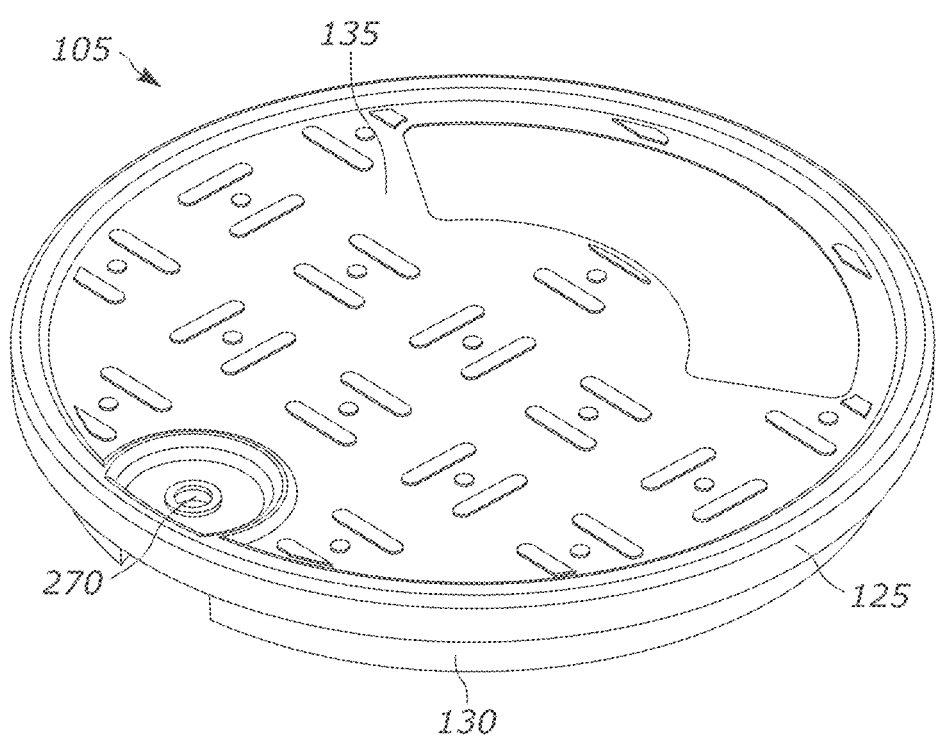
FIG. 6 is a perspective view of the cover of the enclosure of FIG. 1.

As shown in FIG. 6, the illustrated cover 105 may include a first section 125 and a second section 130. The cover 105 may be have a stepped portion where the first section 125 includes a first outer width and the second section 130 includes a second outer width smaller than the first outer width. The first outer width may be substantially the same as the inner width of the flange 115 proximate to the ledge 120.

Figure 3:
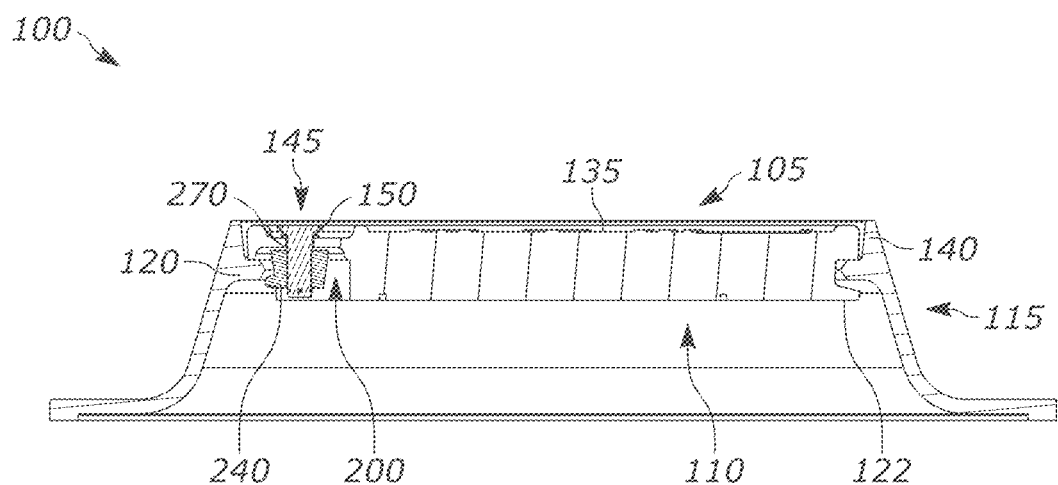
FIG. 3 is a cross-sectional view of the enclosure of FIG. 1, illustrated along section 3-3.
Figure 4:
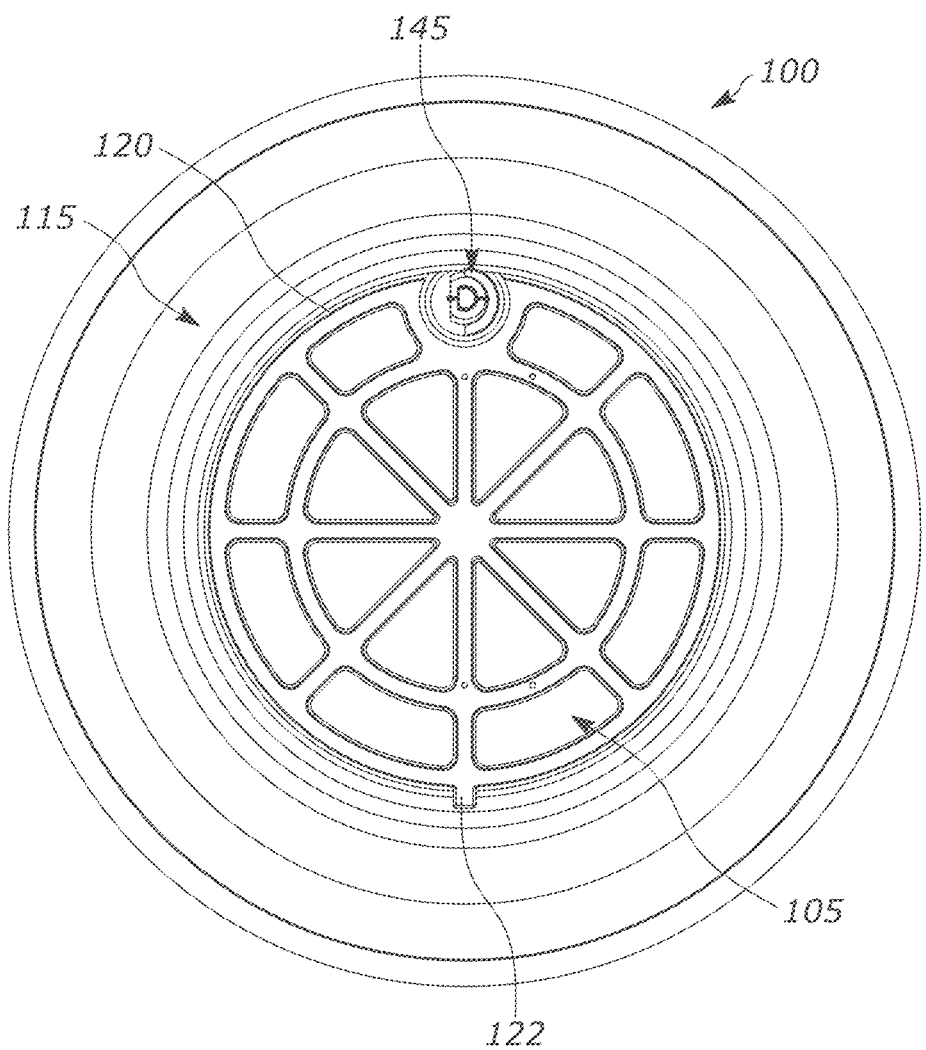
FIG. 4 is a bottom view of the enclosure of FIG. 1 with a fastener in an unlocked position.
Figure 5:
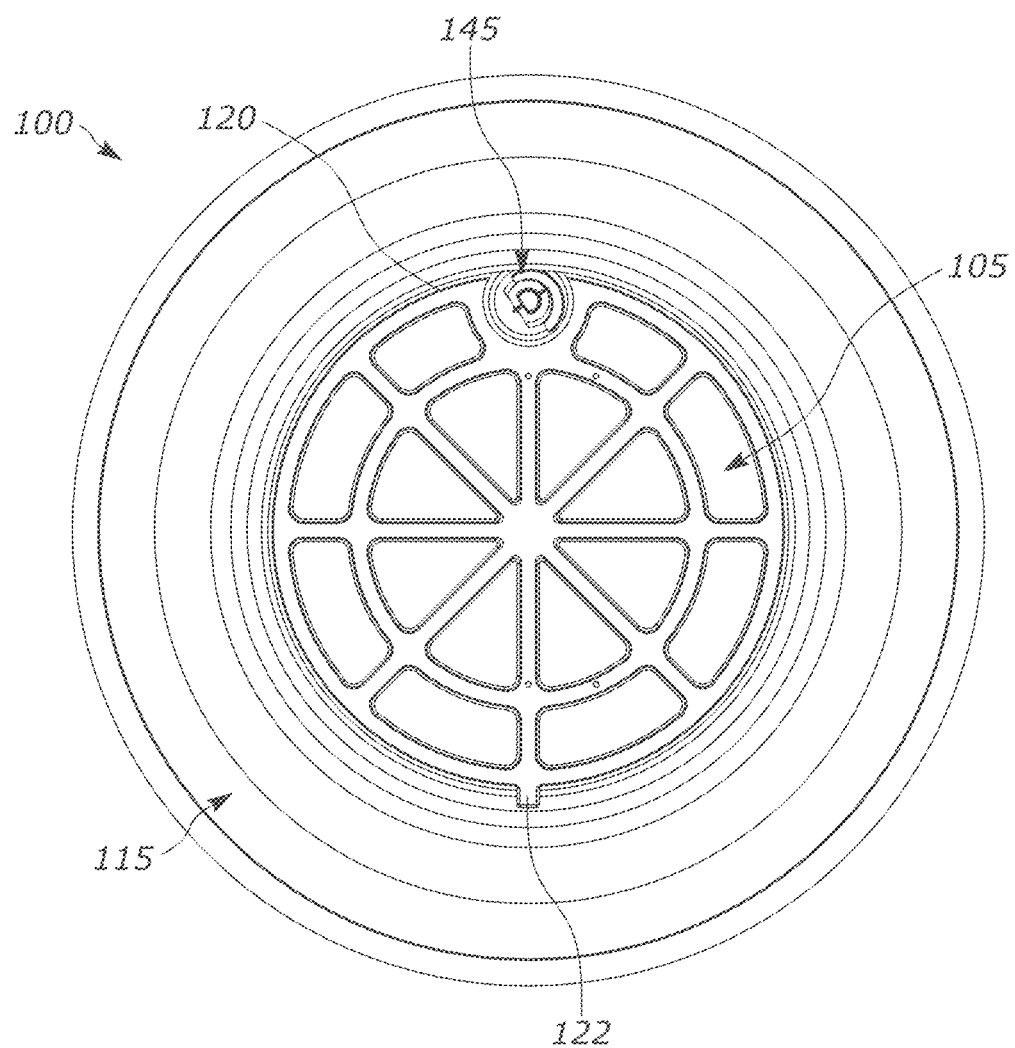
FIG. 5 is a bottom view of the enclosure of FIG. 1 with a fastener in a locked position.

In some forms, the cover may include a tab 122 that may extend from second section 130, as shown in FIGS. 3 to 5. The tab 122 may extend around a portion of the perimeter of the second section 130. Although in other examples, the tab 122 may extend entirely around the perimeter of the second section 130 and/or the tab 122 may be disposed on the first section 125.

As shown in FIGS. 2 to 5, the cover 105 may be positioned so that it is aligned with the opening 110. The outer diameter of the cover 105 may be received within the inner diameter of the opening 110. More specifically, the second outer width of the second section 130 may be received through the opening 110 and may be received through an opening radially inside of the ledge 120. The second outer width of the second section 130 may be adjacent to the inner diameter of the ledge 120. The illustrated example of FIG. 3 shows a small spacing between the second outer width and the inner diameter of the ledge 120, although in other examples, the spacing may be larger or the ledge 120 may be in contact with the second section 130.

The larger first outer width of the first section 125 may be received through the opening 110 but may not be received through the opening radially inside of the ledge 120. In other words, the first outer width may be larger than the inner diameter of the ledge 120. The first section 125 may rest on the ledge 120 while the second section 130 passes through the ledge.

When positioning the cover 105, the tab 122 may be first disposed beneath the ledge 120 so that the first section 125 and the tab 122 are on opposite sides of the ledge 120. The tab 122 may assist in retaining the cover 105 in place.

As shown in FIG. 3, an upper surface 135 of the first section 125 may be at least partially recessed relative to an upper edge 140 of the flange 115. In other examples, at least a portion of the upper surface 135 may be substantially flush with the upper edge 140.

Figure 7:
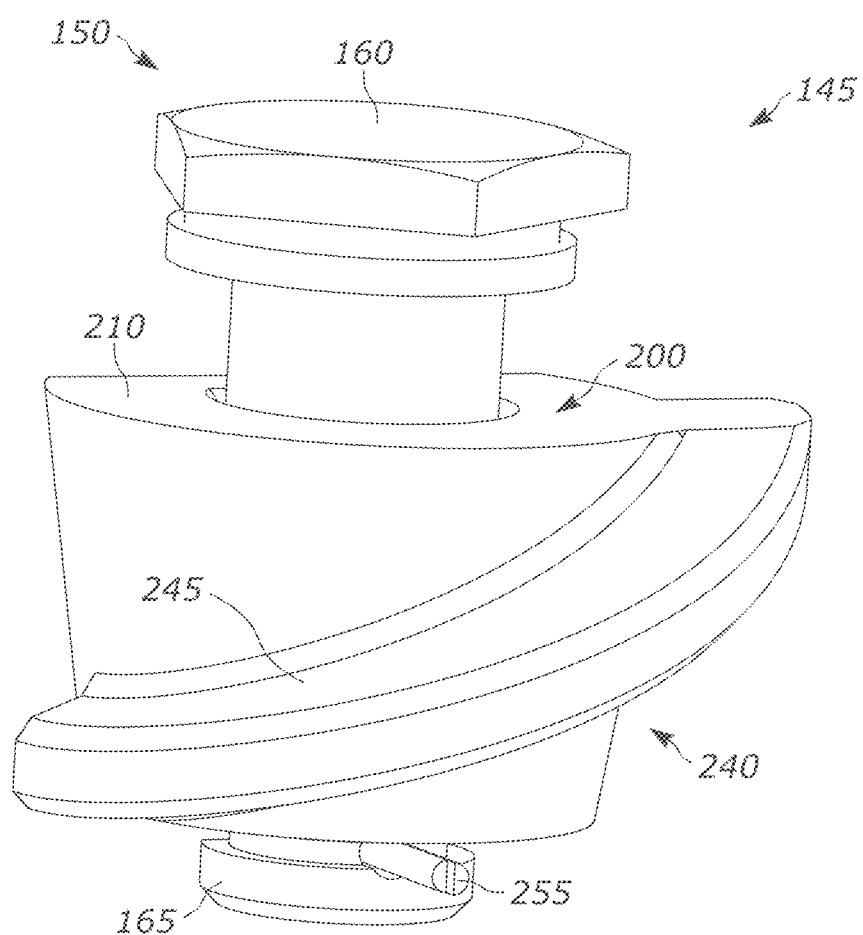
FIG. 7 is a perspective view of the fastener of FIG. 1.

Once positioned through the opening 110, the cover 105 may be secured to the flange 115 with a fastener 145 to limit unauthorized access to the interior. The fastener 145 may be a mechanical fastener used to selectively secure the cover 105 in the closed position. As illustrated in FIG. 7, the fastener 145 may include a bolt 150 and a worm gear 200 that are connected together. As described in more detail below, this may be a removable connection, although in other examples, it may be a permanent connection. In other configurations, the bolt 150 and the worm gear 200 may be integrally formed.

As shown in FIGS. 8 to 12, the bolt 150 may be an elongated member that includes a head 160 and a shaft 165. In the illustrated example, the head 160 may have five sides (e.g., a substantially pentagonal shape), although in other examples, the head 160 may have any number of sides (e.g., three, four, six, etc.). In some forms, the shape of the head 160 may be non-standard in order to limit unauthorized access.

The shaft 165 may be an elongated shaft that extends away from the head 160. The shaft 165 may have an at least partially cylindrical shape. In the illustrated example, the shaft 165 may include a first portion 170 and a second portion 175. The first portion 170 is disposed adjacent to the head 160 and the second portion 175 is disposed adjacent to the first portion 170 and distal to the head 160. The first portion 170 may be substantially cylindrical and the second portion 175 may include a cutout 180.

Figure 9:
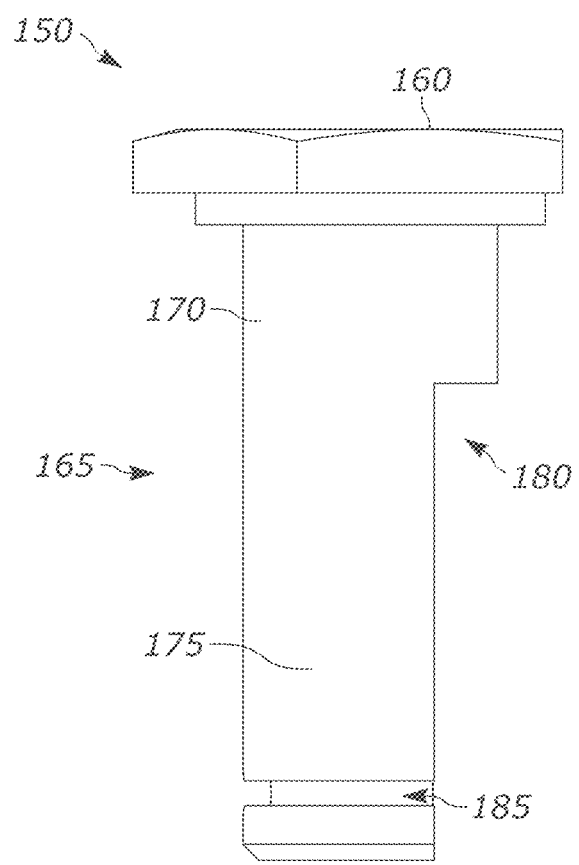
FIG. 9 is a side view of the bolt of FIG. 8.
Figure 10:
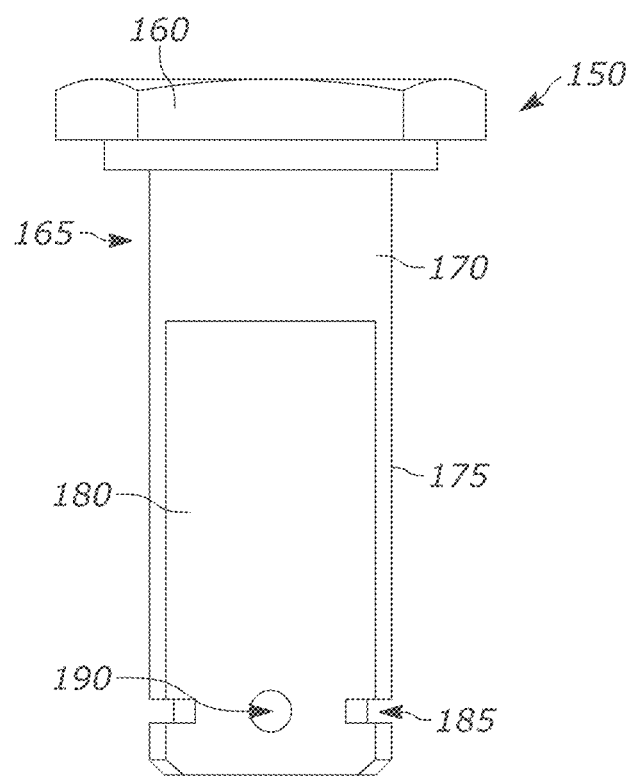
FIG. 10 is a front view of the bolt of FIG. 8.

As illustrated in FIGS. 9 and 10, the cutout 180 is substantially rectangular in shape, although the cutout 180 may be any other shape (e.g., elliptical, etc.). The cutout 180 may extend substantially the entire length of the second portion 175.

As shown in FIG. 10, the cutout 180 may extend only partially through the width of the second portion 175. For example, some examples of the second portion 175 may include a cutout 180 that extends less than three-quarters of the way through the second portion 175. In other examples, the cutout 180 may extend less than about half way through the second portion 175. In other examples, the cutout may extend about a quarter of the way through the second portion 175.

In other examples, the width of the cutout 180 may be substantially equivalent to the outer width of the second portion 175. The width of the cutout 180 may be related to how far the cutout 180 extends into the second portion 175.

Figure 8:
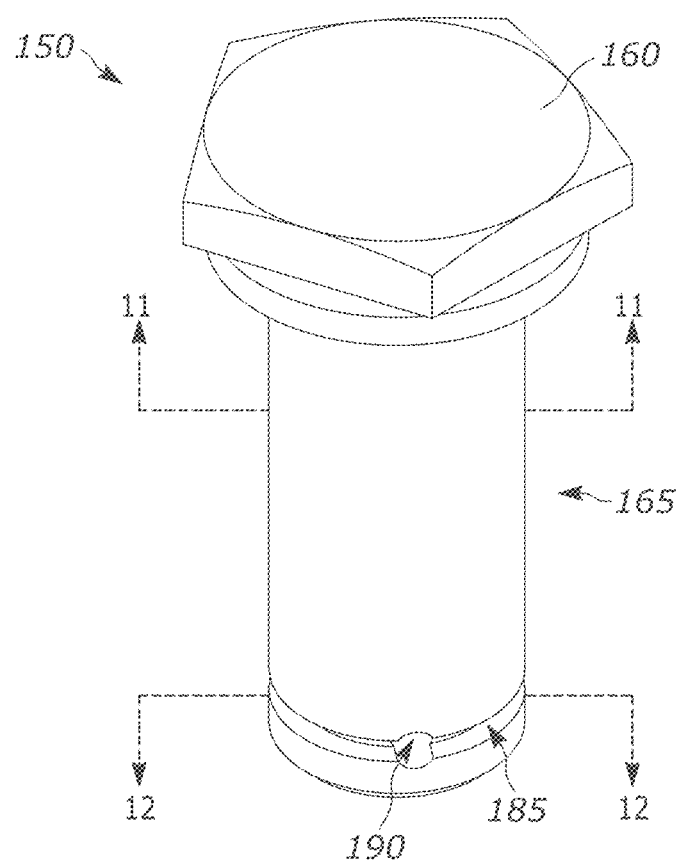
FIG. 8 is a perspective view of a bolt of the fastener of FIG. 7.

As shown in FIGS. 8 to 10, the second portion 175 may further include a groove 185. The groove 185 is formed into the wall of the second portion 175 and extends toward a center of the second portion 175. In some forms, the groove 185 may extend substantially around the perimeter of the second portion 175. For example, the groove 185 may extend from one side of the cutout 180 to the other side of the cutout 180 along the curved region of the second portion 175.

Figure 12:
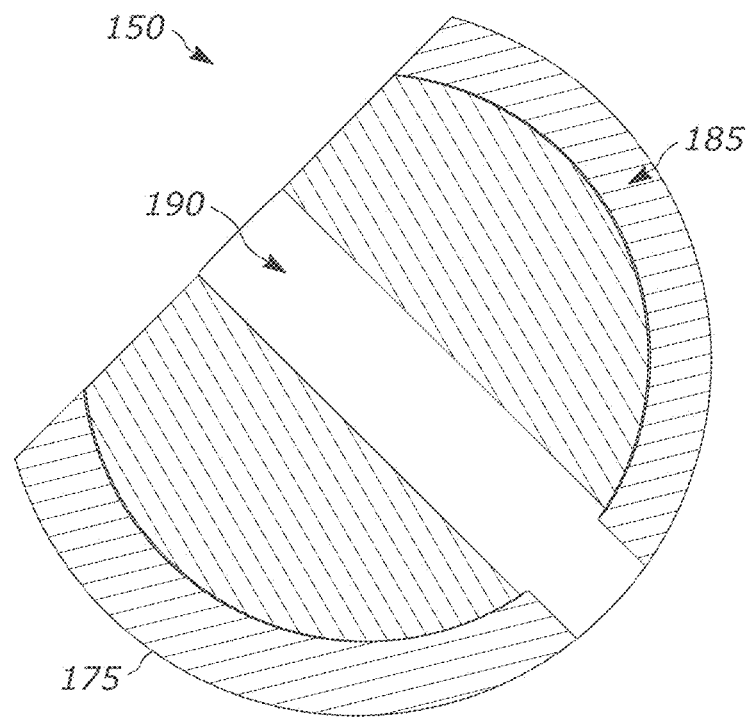
FIG. 12 is a second cross-sectional view of the bolt of FIG. 8, viewed along section 12-12.

As shown in FIG. 12, the groove 185 may extend at least partially toward a center of the second portion 175. For example, the illustrated groove 185 may extend less than half way through the width of the second portion 175. In some forms, the groove 185 may extend about a quarter of the way through the second portion 175.

The groove 185 may include a substantially rectangular shape in cross-section. For example, the interior of the groove 185 may be angled and include walls that are substantially perpendicular to any adjacent walls. In other examples, the walls forming the groove 185 may be at least partially curved (e.g., curved along substantially the entire length, rounded at corners between adjacent walls, etc.) and/or may be formed at an angle other than 90° with respect to adjacent walls.

As shown in FIGS. 8 and 10, the second portion 175 may also include a bore 190. The illustrated bore 190 may be oriented substantially perpendicular to the wall of the groove 185 (although the bore 190 could include any other orientation). The bore 190 may also include a substantially circular perimeter, although a perimeter of any other shape (e.g., elliptical, rectangular, etc.) may also be used. The bore 190 may extend entirely through the second portion 175. The bore 190 may be a through hole that travels entirely through the second portion 175 or it may be a blind bore that extends only partially through the second portion 175.

As shown in FIG. 10, the bore 190 may be disposed substantially in a middle of a wall of the second portion 175 forming the cutout 180. For example, a center of the bore 190 may intersect a plane that intersects a center of the second portion 175 and a center of the first portion 170. The bore 190 may therefore be disposed a substantially equal distance between either end of the groove 185. In other examples, the center of the bore 190 may be spaced apart from the plane, and the plane may intersect a portion of the bore 190 or may not intersect the bore at all. In either alternate case, the bore 190 may be closer to one end of the groove 185 than to the other.

The bore 190 may be positioned on substantially the same plane as the groove 185. The plane may be substantially perpendicular to the second portion 175 and does not intersect the first portion 170. In other examples, the bore 190 may be disposed on a different plane than the groove 185.

Figure 11:
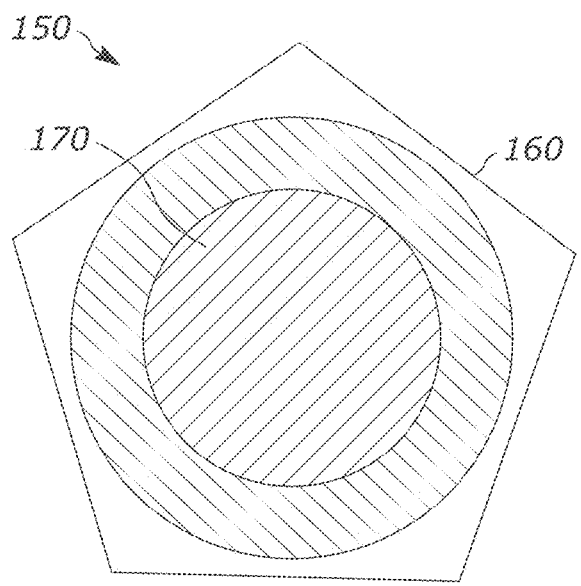
FIG. 11 is a first cross-sectional view of the bolt of FIG. 8, viewed along section 11-11.

At least a portion of the bolt 150 may be constructed from a single material. As shown in FIGS. 11 and 12, the shaft 165 may be integrally formed from a single material. The shaft may be constructed from a non-metallic material, for example molded nylon, although other materials (e.g., plastic, metal, etc.) may also be used. Additionally, other examples of the shaft 165 may be constructed from a combination of materials (e.g., an inner material and an outer material).

The head 160 of the bolt 150 may similarly be constructed from a single material. In some examples, this material may be the same material as the shaft 165. The head 160 and the shaft 165 may be integrally formed during a manufacturing process (e.g., molding). In other examples, the head 160 may be constructed from one or more different materials than the shaft 165.

As shown in FIGS. 13 to 20, the fastener 145 may further include a worm gear 200 that assists with connecting the cover 110 to the flange 115. As described in more detail below, the bolt 150 and the worm gear 200 may be connected together in order to form the fastener 145.

Figure 13:
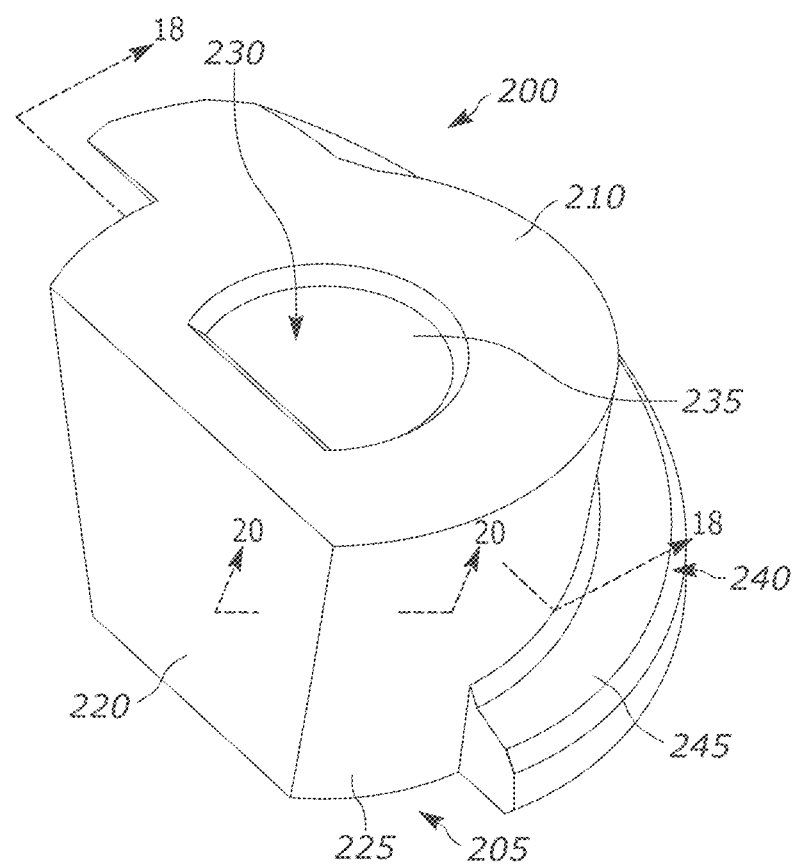
FIG. 13 is a perspective view of a worm gear of the fastener of FIG. 7.

As shown in FIG. 13, the worm gear 200 may include a body 205. The body 205 may include a top surface 210, a bottom surface 215 (see e.g., FIG. 15), and at least one side surface. The illustrated worm gear 200 includes a first side surface 220 and a second side surface 225, although the body 205 may include any number of side surfaces (e.g., three, four, five, six, etc.).

In some forms, the first side surface 220 may be substantially planar and may extend between the top surface 210 and the bottom surface 215. The top and bottom surfaces 210, 215 may also be planar surfaces, although one or more of the top and bottom surfaces 210, 215 may be non-planar.

In certain forms, the first side surface 220 may be substantially perpendicular with respect to the top surface 210 and/or to the bottom surface 215. However, in other examples, the first side surface 220 may be oblique with respect to the top surface 210 and to the bottom surface 215.

Figure 14:
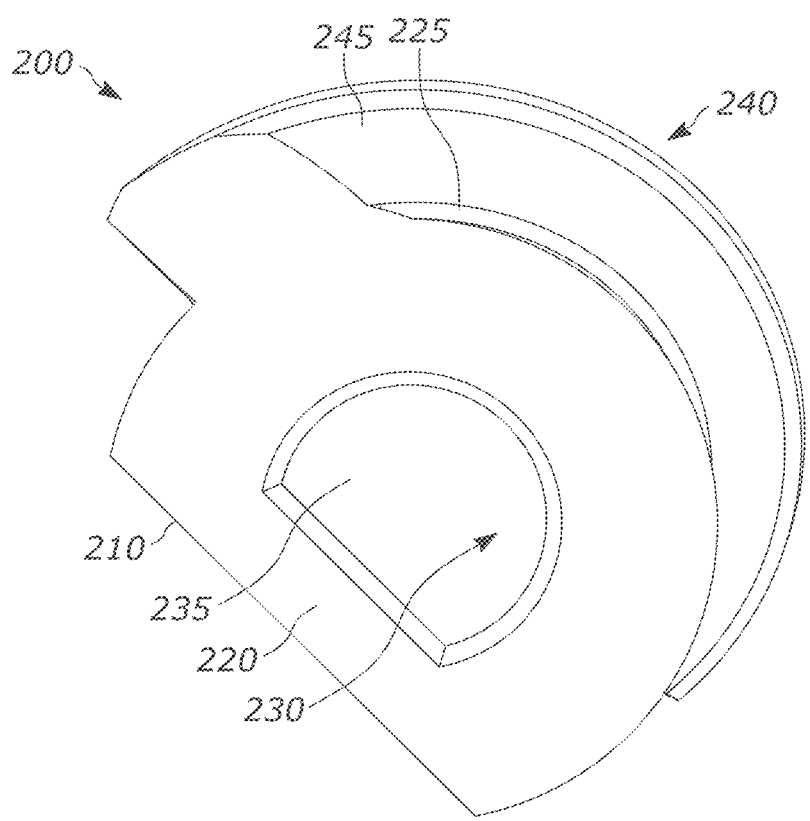
FIG. 14 is a top view of the worm gear of FIG. 13.
Figure 15:
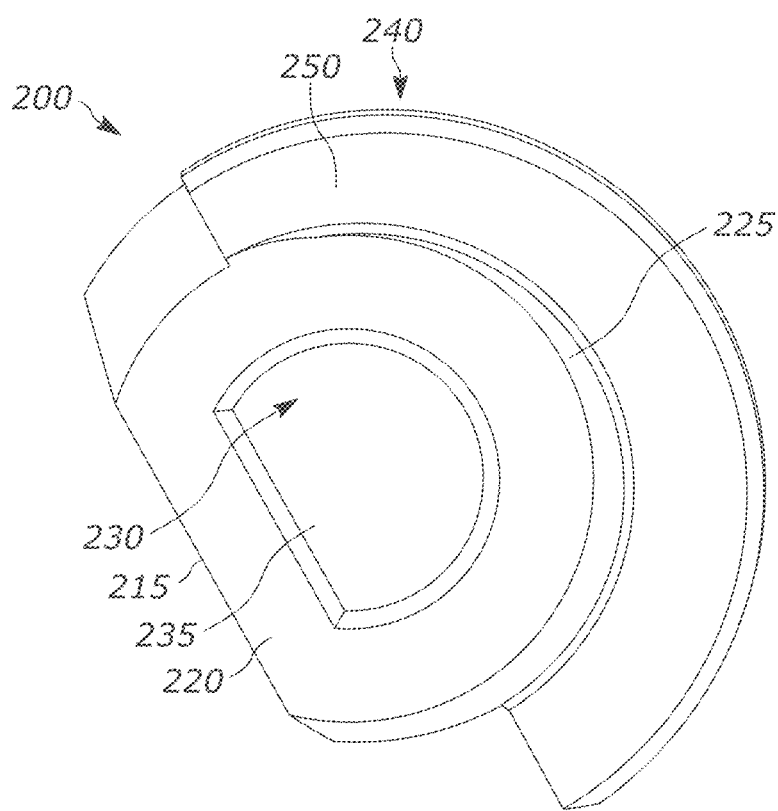
FIG. 15 is a bottom view of the worm gear of FIG. 13.
Figure 16:
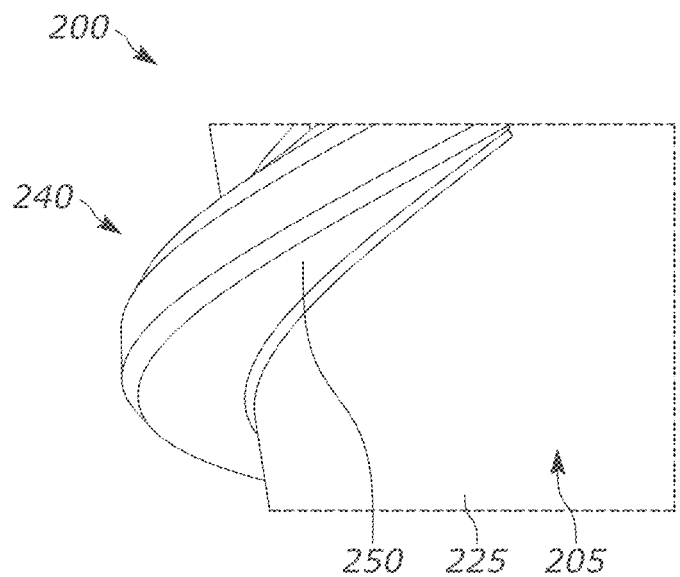
FIG. 16 is a first detail view of the worm gear of FIG. 13.
Figure 17:
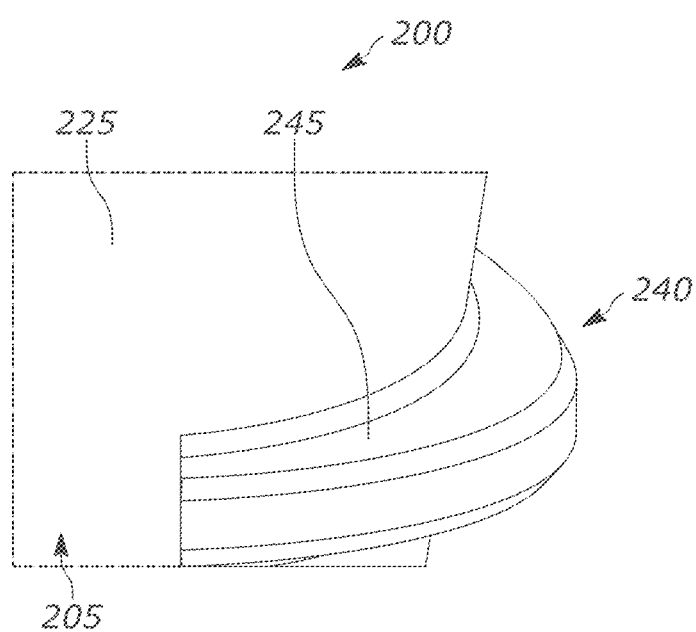
FIG. 17 is a second detail view of the worm gear of FIG. 13.

With continued reference to FIG. 13, the second side surface 225 may be a curved surface that extends between edges of the first side surface 220. The second side surface 225 may have a constant radius of curvature, although other examples may have a variable radius of curvature. As shown in FIGS. 13 to 15, the top and bottom surfaces 210, 215 may be substantially D-shaped because of the planar first side surface 220 and the curved second side surface 225.

An aperture 230 may extend through the body 205 between the top surface 210 and the bottom surface 215. The illustrated aperture 230 may be a through hole that extends entirely through the body 205. The aperture 230 may extend in a direction that is substantially perpendicular to the top surface 210 and to the bottom surface 215. In other examples, the aperture 230 may be oblique with respect to at least one of the top surface 210 and the bottom surface 215.

In some forms, the aperture 230 may have substantially the same shape as the top surface 210 and/or the bottom surface 215. For example, opening to the aperture 230 may be substantially D-shaped. In other examples, the aperture 230 may be any other shape (e.g., circular, elliptical, triangular, rectangular, pentagonal, etc.).

Figure 18:
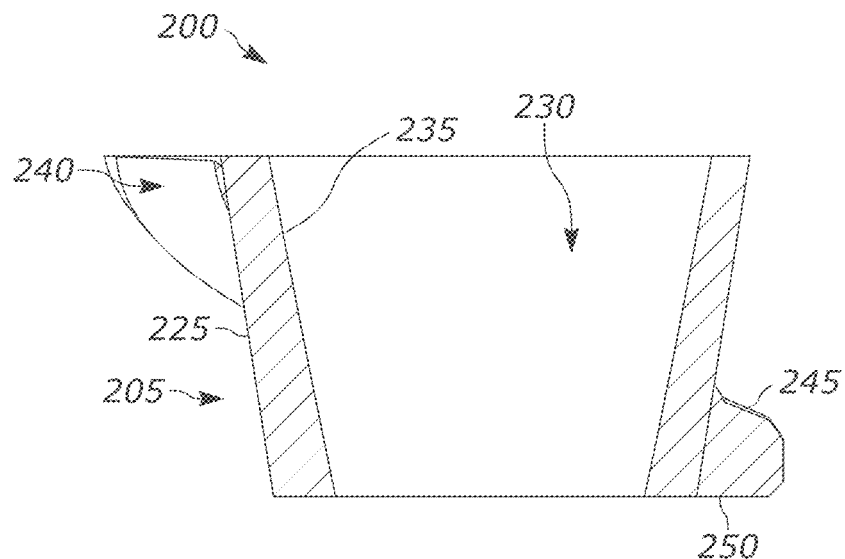
FIG. 18 is a first cross-sectional view of the worm gear of FIG. 13, viewed along section 18-18.

As shown in FIG. 18, the aperture 230 may include an inner wall 235 that is tapered between the top surface 210 and the bottom surface 215. The illustrated aperture 230 includes a larger width proximate to the top surface 210, although other examples may include a larger width proximate to the bottom surface 215. The taper between the top surface 210 and the bottom surface 215 is illustrated as being a constant taper (e.g., the inner wall 235 includes a constant slope between the top surface 210 and the bottom surface 215 as viewed in cross section), although other examples may include a varying taper.

Some forms may also include a taper between the top surface 210 and the bottom surface 215 of the outer surface of the body 205. As illustrated in FIG. 18, the taper on the outer surface may be oriented at the same angle as the taper of the inner wall 235, although there may be differing tapers. The taper between the top surface 210 and the bottom surface 215 may extend so that the top surface 210 is wider than the bottom surface 215. When assembled, the narrower bottom surface 215 may be closer to the ledge 120 than the top surface 210.

Figure 19:
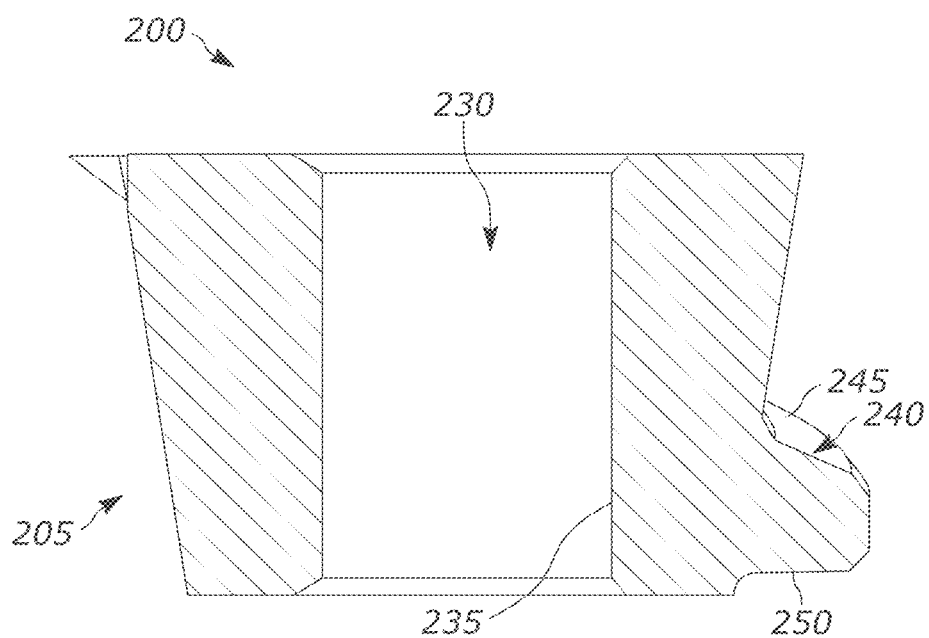
FIG. 19 is a first cross-sectional view of the worm gear of an alternate example of the worm gear of FIG. 13, viewed along section 18-18.
Figure 20:
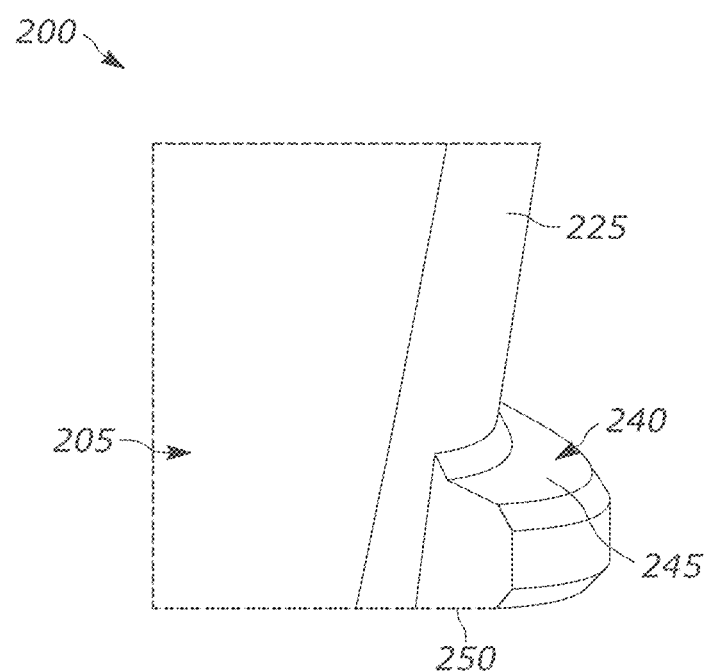
FIG. 20 is a second cross-sectional view of the worm gear of FIG. 13, viewed along section 20-20.

As shown in FIG. 19, other examples of the aperture 230 may include an inner wall 235 that is substantially perpendicular with respect to the top surface 210 and the bottom surface 215. In other words, the inner wall 235 may not include a taper. The body 205 (e.g., the outer wall) of the worm gear 200 may still be tapered between the top and bottom surfaces 210, 215.

Other examples of the body 205 do not include a taper on an outer wall between the top surface 210 and the bottom surface 215. The lack of a taper on the outer wall of the body 205 may be independent of whether the inner wall 235 includes a taper.

As shown in FIGS. 13 to 17, a helical portion 240 may be connected to the body 205. Specifically, the helical portion 240 may extend from the second side surface 225. The helical portion 240 may extend along the body 205 substantially between the top surface 210 and the bottom surface 215. As illustrated in FIGS. 13 and 14, one end of the helical portion 240 may be substantially flush with the top surface 210. In other examples, an end of the helical portion 240 may be spaced apart (e.g., either above or below) the top surface 210.

As illustrated in FIG. 15, the opposite end of the helical portion 240 may be spaced apart from the bottom surface 215 so that it is not flush. However, other examples of the helical portion 240 may be flush with the bottom surface 215 or may extend beyond the bottom surface 215 (e.g., in a direction away from the top surface 210).

With continued reference to FIGS. 13 to 15, the helical portion 240 may extend around only a portion of the body 205. For example, the helical portion 240 may extend around only a portion of the second side surface 225. In the illustrated example, the ends of the helical portion 240 may be spaced apart from the first side surface 220.

In some forms, the helical portion 240 may extend around the body 205 between about 1 degree and about 359 degrees. In some forms, the helical portion 240 may extend around the body 205 between about 10 degrees and about 300 degrees. In some forms, the helical portion 240 may extend around the body 205 between about 45 degrees and about 270 degrees. In some forms, the helical portion 240 may extend around the body 205 between about 90 degrees and about 225 degrees. In some forms, the helical portion 240 may extend around the body 205 about 180 degrees.

The helical portion 240 may have an upper surface 245 and a lower surface 250 that is spaced apart from the upper surface 245. In the illustrated example of FIGS. 12 and 19, at least one of the upper surface 245 and the lower surface 250 may be inclined relative to the other surface. For example, a distance between the upper surface 245 and the lower surface 250 may change. In some forms, the distance between the upper surface 245 and the lower surface 250 is greater proximate to the second side surface 225 than on a free end distal to the second side surface 225.

In some forms, the upper surface 245 is inclined relative to the lower surface 250. For example, the lower surface 250 may be substantially parallel or co-planar to the bottom surface 215 and the upper surface 245 may be inclined relative to the bottom surface 215. However, in other forms, the lower surface 250 may be inclined instead of or in addition to the upper surface 245.

In some forms, a width of the helical portion 240 may change along its length. For example, FIG. 18 shows the helical portion 240 with a greater width proximate to the top surface 210 than at the bottom surface 215. This change in width may be a constant change in width, or it may be a variable change in width.

Returning to FIGS. 13 to 15, the aperture 230 may be oriented relative to the helical portion 240 so that the curved portion of the substantial D shape is proximate to the helical portion 240. For example, a planar portion of the inner wall 235 may be disposed proximate to the first side surface 220 where the helical portion 240 does not extend across.

As shown in FIG. 7, the fastener 145 may be assembled by connecting the bolt 150 and the worm gear 200. The second portion 175 includes a cutout 180 so that the second portion 175 is substantially D-shaped when viewed in cross section (see e.g., FIG. 12). The D-shape of the second portion 175 may be substantially the same as the D-shape of the aperture 230.

When assembling the fastener 145, the bolt 150 may be oriented with the second portion 175 proximate to the aperture 230 in the top surface 210. The D-shaped aperture 230 may allow the bolt 150 to be inserted in a single orientation (e.g., because the aperture 230 and the second portion 175 are not symmetric). The bolt 150 may be inserted through the aperture 230 until the first portion 170 contacts the top surface 210. For example, the width of the first portion 170 may be wider than the width of the aperture 230. The first portion 170 may therefore remain outside of the aperture 230 when fully assembled.

In some forms, the length of the second portion 175 of the bolt 150 may be larger than the length of the aperture 230. The second portion 175 may extend beyond the aperture 230 so that a portion of the bolt 150 is exposed outside of the aperture 230 proximate to the top surface 210 and proximate to the bottom surface 215.

As shown in FIG. 7, the groove 185 and/or the bore 190 may be included on the region of the exposed second portion 175. In other words, the groove 185 and/or the bore 190 are not received in the aperture 230 when the fastener 145 is fully assembled.

In some forms, the bolt 150 may be press fit or friction fit into the aperture 230 when assembled. For example, the width of the second portion 175 may be slightly larger than the width of the aperture 230 so that the bolt 150 is secured when fully assembled.

In some forms, a retainer 255 may be used to secure the bolt 150 within the aperture 230. The retainer 255 may be used whether or not the bolt 150 is press fit or friction fit within the aperture 230. For example, the retainer 255 may limit transitional movement of the bolt 150 along an insertion axis through the aperture 230.

As shown in FIGS. 21A to 21D, one form of the retainer 255 may be a pin (e.g., a cotter pin) that is selectively positioned through the bore 190. As described above, the bolt 150 may be inserted through the aperture 230 so that at least some of the second portion 175 passes entirely through the aperture 230. This portion includes the bore 190 so that an insertion axis through the bore 190 does not intersect the worm gear 200 when the bolt 150 is fully inserted within the aperture 230 (e.g., where the first portion 170 contacts the top surface 210). The bore 190 is therefore exposed so that the retainer 255 may be positioned through the bore 190 and the bolt 150 is retained within the aperture 230.

A variety of different pin-style retainers may be used to retain the bolt 150. Any one of these retainers 255 may function in substantially the same way as any of the other pin described in FIGS. 21A to 21D to selectively retain the bolt 150 within the aperture 230. For example, the retainer 255 may include a cotter pin, a hitch pin, a spring pin, a detent pin, or any other similar pin. Additionally, the fastener 255 can be a clothes pin or a similar household item that is readily available.

As shown in FIGS. 22A to 22F, the retainers may also take the form of various styles of washers. Unlike the pins insertable through the bore 190, the washer-style retainers 260 may be positioned within the groove 185. Similar to the bore 190, the groove 185 may be positioned on the section of the second portion 175 that extends beyond the aperture 230 so that the groove 185 remains exposed. The washer-style retainers 260 may be fitted into the groove 185 (e.g., by sliding over an end of the bolt 150 after the bolt 150 is inserted through the aperture 230). The washer-style retainers 260 may similarly retain the bolt 150 against translational movement within the aperture 230 along the insertion axis.

In some forms, the retainer 255 and the washer-style retainer 260 may be used together to retain the bolt 150 within the aperture 230. In other examples, the user may select either the retainer 255 or the washer-style retainer 260 (or neither) to retain the bolt 150.

Figure 21A:
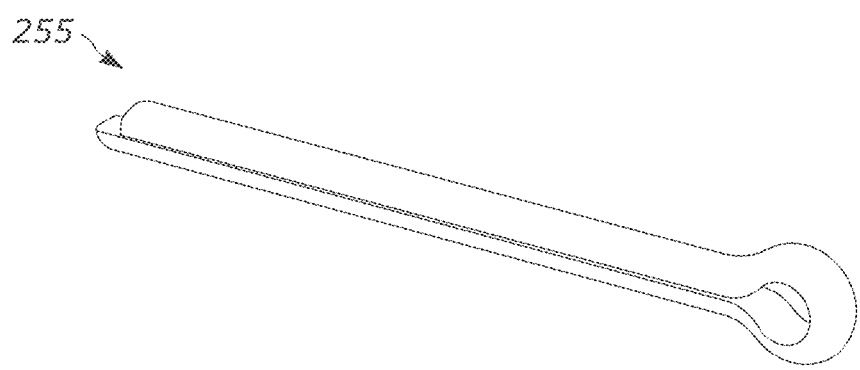
FIGS. 21A-21D are perspective views of various first retainers used to retain the bolt of FIG. 8 within the worm gear of FIG. 13.
Figure 21B:
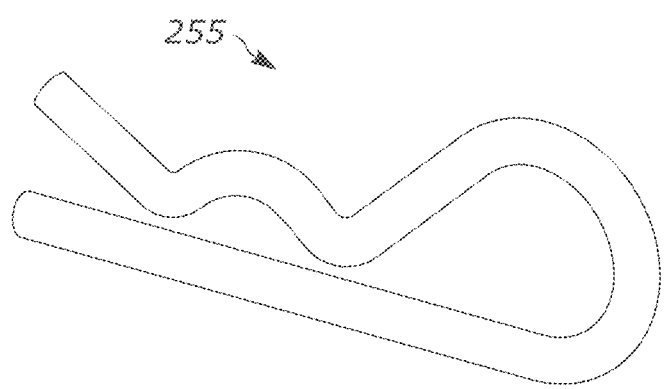
Figure 21C:
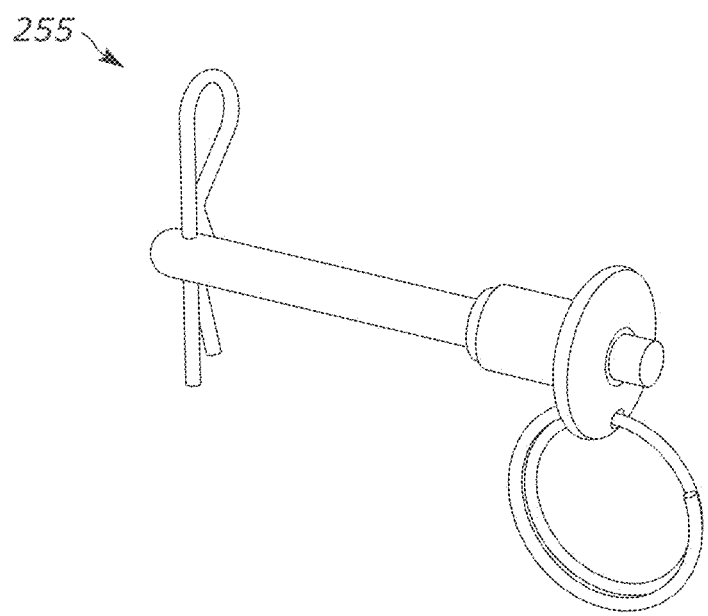
Figure 21D:
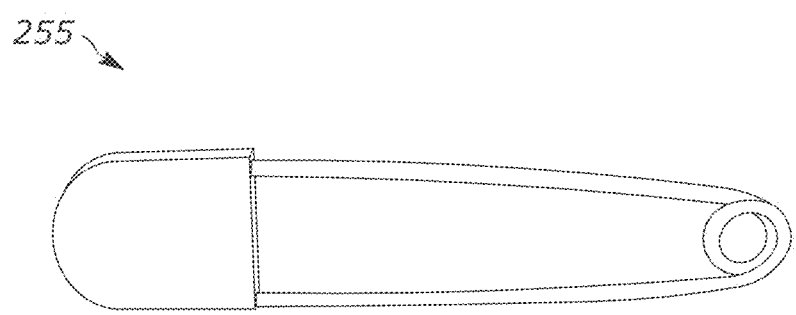
Figure 22A:
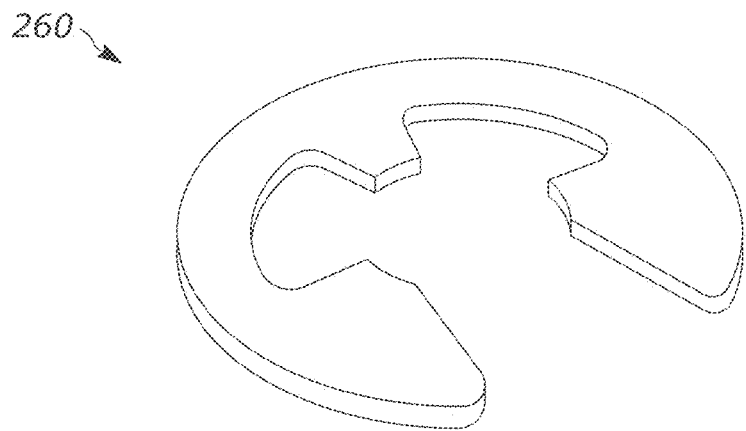
FIGS. 22A-22F are perspective views of various second retainers used to retain the bolt of FIG. 8 within the worm gear of FIG. 13.
Figure 22B:
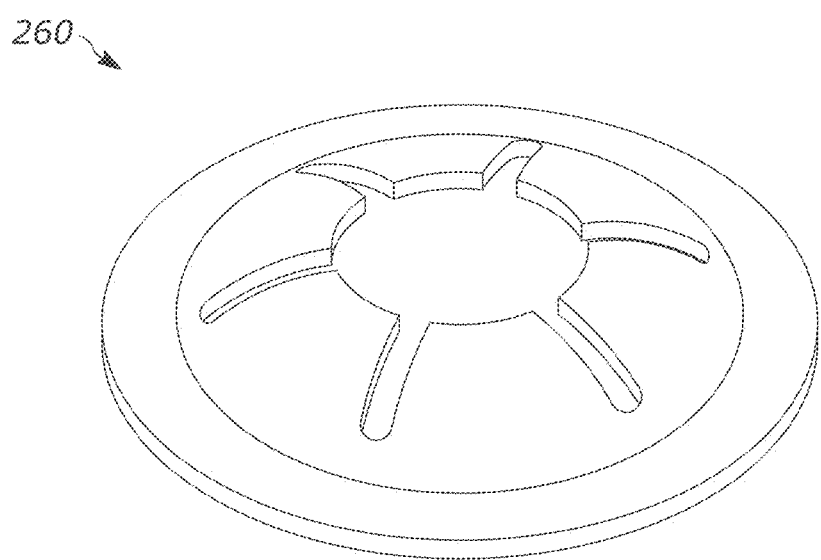
Figure 22C:
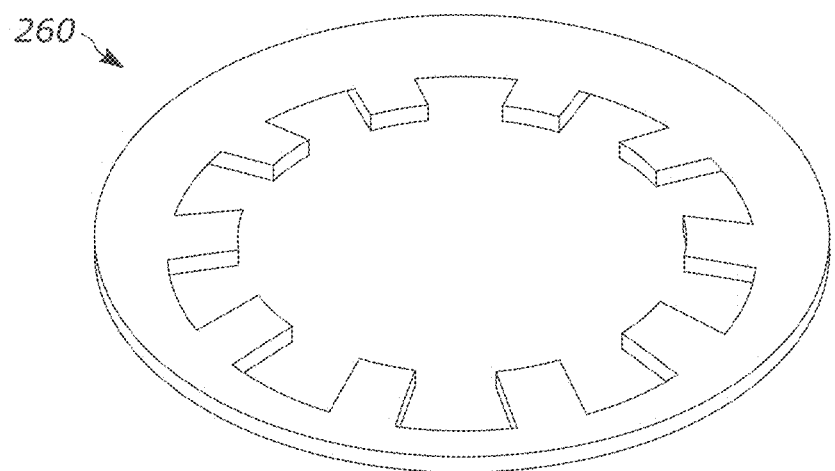
Figure 22D:
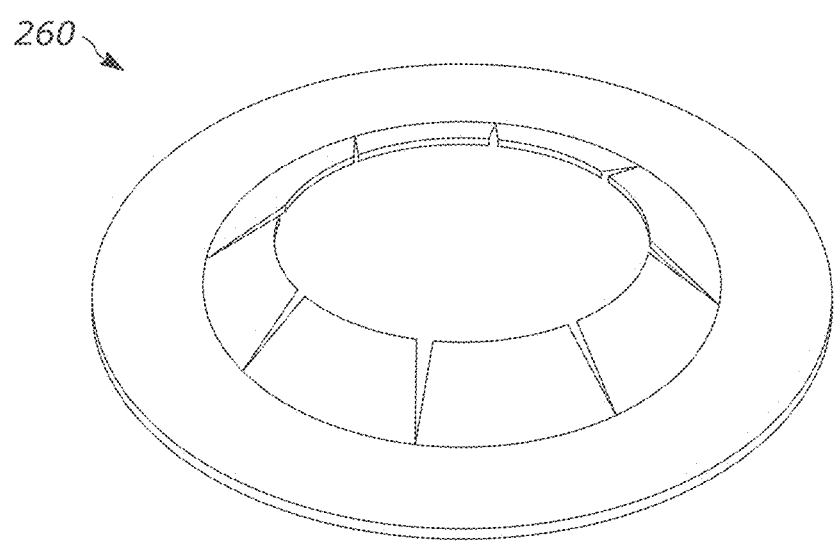
Figure 22E:
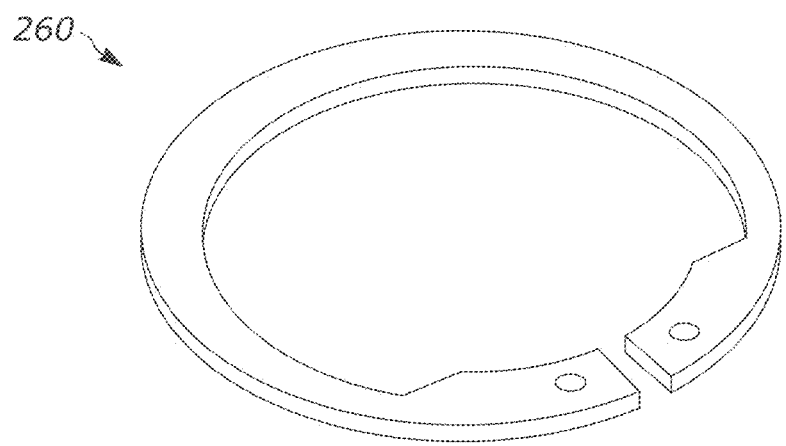
Figure 22F:
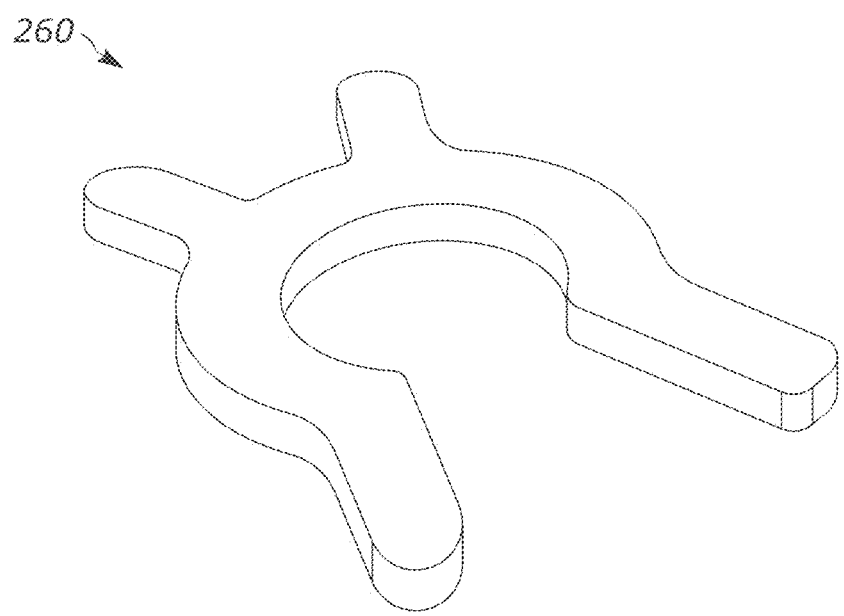

In some forms, the retainers 255 and/or the washer-style retainers 260 may not be custom-machined parts. Instead, the retainers 255 and/or the washer-style retainers 260 may be commonly-found components (e.g., FIG. 21D illustrates a safety pin). This may allow for easy replacement if the retainers 255 and/or the washer-style retainers 260 breaks.

Returning to FIGS. 1 to 5, the fastener 145 may be coupled to the cover 105. And may be used to connect the cover 105 to the flange 115. For example, the illustrated cover 105 may include an opening 270 that extends through the cover 105 (e.g., a through hole). The opening 270 may be sized to receive the bolt 150. For example, the opening 270 may include a width that substantially corresponds to the width of the first portion 170 to allow the shaft 165 to pass through. When assembled, the head 160 may be positioned on one side of the cover 105 and the second portion 175 and worm gear 200 may be disposed on the opposite side of the cover 105.

In some forms, the bolt 150 may be inserted through the opening 270 prior to being connected to the worm gear 200. For example, the bolt 150 may be positioned through the opening 270 until the head 160 contacts the surface of the cover 105 (e.g., thereby preventing further translational movement in that direction). The worm gear 200 and the retainer 255, 260 may then be connected to the bolt 150 on the other side of the cover 105 to retain the fastener 145 relative to the cover 105.

In the connected position, the fastener 145 may be rotatable relative to the cover 105 but may not be translatable relative to the cover 105. For example, the first portion 170 and the opening 270 may be circular to allow the bolt 150 to rotate within the opening 270.

In some forms, the bolt 150 and the worm gear 200 may rotate together relative to the cover 105. For example, the aperture 230 and the second portion 175 may be non-symmetrically shaped and limit relative movement when connected together.

The worker may position the cover 105 within the opening 110 of the flange 115. Once the first section 125 rests on the ledge 120, the worker may use a tool to rotate the fastener 145 relative to the cover 105. Specifically, the worker may apply a torque to the head 160 of the bolt 150 to rotate the bolt 150 relative to the cover 105. As described above, the asymmetric shape of the bolt 150 and the worm gear 200 allows the worm gear 200 to rotate with the bolt 150. Rotation of the worm gear 200 causes the helical portion 240 to rotate relative to the flange 115.

For example, the fastener 145 may be initially positioned so that the helical portion 240 does not interfere with the ledge 120 (see e.g., FIG. 4). This permits the cover 105 to be positioned in the opening 110 without substantial interference. To connect the cover 105 to the flange 115, the worker rotates the fastener 145 so that the helical portion 240 engages the flange 115. As illustrated in FIG. 5, the fastener 145 rotates so that the helical portion 240 engages a lower surface of the ledge 120 (e.g., opposite to the surface that the first section 125 contacts. Continued rotation of the fastener 145 causes the helical portion 240 closer to the top surface 210 to contact the ledge 120 and draw the cover 105 into closer contact with the ledge 120 so that the cover 105 is in tight engagement with the flange 115. For example, the first portion 125 and the tab 122 are drawn into closer contact with the flange 115 to more tightly sandwich the ledge 120. In this position, the first portion 125 and the helical portion 240 limit the translation of the cover 105 relative to the flange 115.

This fastener 145 may offer advantages over fasteners currently used to secure covers. For example, using a non-metallic material (e.g., nylon, polypropylene, etc.) to manufacture at least a portion of the fastener 145 may reduce manufacturing costs. For example, the non-metallic materials may be cheaper than metals and/or may require less machining to meet specified tolerances.

The forces necessary for the fastener 145 to retain the cover 105 may be achievable with non-metallic materials. Additionally, workers may inspect utilities enclosed by the cover 105 infrequently. In other words, workers are not frequently tightening and untightening the fastener 145. Even if a non-metallic fastener 145 has a lower number of cycles until failure, the infrequency at which the cycles occur and the relatively inexpensive cost to replace the fastener 145 may still allow for the use of non-metallic materials.

In other examples, metallic materials (e.g., steel, brass, etc.) may nonetheless be used when manufacturing at least a portion of the fastener 145.

The shape of the fastener 145 may also assist in connecting the fastener 145 to the cover 105. For example, the outer portion of the body 205 of the worm gear 200 may be tapered between the upper surface 210 and the lower surface 215. The taper of the body 205 may allow the worm gear 200 to fit in and be used with a variety of different covers 105 and/or flanges 115. For example, the ledge 120 in the flange 115 may have different sizes based on the specific manufacturer and/or different manufacturing tolerances that are used. The tapered shape of the outer portion of the body 205 may allow the worm gear 200 to act as a universal connector and be used with a variety of shaped and sized flanges 115.

A taper on the inner wall 235 of the worm gear may allow different sized bolts 150 to be used with the worm gear 200. For example, the tapered shape may accommodate bolts 150 with different manufacturing tolerances or produced by similar manufacturers. The taper of the inner wall 235 may similarly allow the worm gear 200 to act as a universal connector.

The limited number of components also provides an ease of use for workers. For example, the disclosed fastener 145 includes only three elements (e.g., the bolt 155, the worm gear 200, and the retainer 255). These elements may be quickly assembled (e.g., in a few seconds) without the need for additional tools. Additionally, the interconnectivity among different sized or shaped components allows a worker to quickly replace a broken component in the field without having to acquire a custom-made part. As described above, a variety of components may be used to form the retainer 255, including ordinary components not manufactured for this specific application. Workers may therefore be able to use components that they have readily available to form a retainer 255.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described. Those skilled in the art will also appreciate that various adaptations and modifications of the above-described preferred examples can be configured without departing from the scope and spirit of the disclosure. Therefore, it is to be understood that, within the scope of the appended claims, the disclosure may be practiced other than as specifically described.

What is claimed is:
1. A utility enclosure comprising:
a flange having an opening and a ledge disposed within the opening;
a cover selectively positioned at least partially within the opening and configured to contact the ledge;
a fastener configured to selectively connect the cover to the flange, the fastener including:
a bolt having a head and a shaft that extends from the head, the shaft includes a connecting region proximate to a free end of the shaft,
a worm gear having a body comprising,
an upper surface and a lower surface,
an aperture extending through the body between the upper surface and the lower surface, wherein the aperture is configured to receive the shaft,
a helical portion on an outer surface of the body extending at least partially between the upper surface and the lower surface, and
a retainer selectively connected to the connecting region and configured to retain the bolt within the aperture,
wherein the fastener is configured to rotate relative to the cover to move from an unlocked position to a locked position, and
wherein the body is tapered between the upper surface and the lower surface.

2. The utility enclosure of claim 1, wherein at least a portion of the fastener is constructed from a non-metallic material.

3. The utility enclosure of claim 1, wherein the connection region includes a bore that extends through the shaft, and wherein the retainer is a pin selectively positionable within the bore when the bolt is received within the aperture.

4. The utility enclosure of claim 1, wherein the connection region includes a groove that extends at least partially around the shaft, and wherein the retainer is a washer selectively positionable within the groove when the bolt is received within the aperture.

5. The utility enclosure of claim 1, wherein the shaft and the aperture each include an asymmetrical shape configured to mate with one another to limit relative rotation between the bolt and the worm gear.

6. The utility enclosure of claim 1, wherein the helical portion is flush with the upper surface and is spaced apart from the lower surface.

7. A fastener for a utility enclosure comprising:
    a bolt constructed from a first non-metallic material and having a head and a shaft that extends from the head, the shaft having a non-symmetrical shape and includes a connecting region proximate to a free end of the shaft,
    a worm gear having a body constructed from a second non-metallic material, the body including,
    an upper surface and a lower surface,
    an aperture extending through the body between the upper surface and the lower surface, wherein the aperture having a non-symmetrical shape complementary to the non-symmetrical shape of the bolt is configured to receive the shaft,
    a helical portion on an outer surface of the body extending at least partially between the upper surface and the lower surface, and
    a retainer selectively connected to the connecting region and configured to retain the bolt within the aperture;
    wherein the fastener is configured to rotate with the worm gear; and
    wherein the body is tapered between the upper surface and the lower surface.

8. The fastener of claim 7, wherein the body narrows from the top surface to the body surface, and wherein the head is configured to be disposed proximate to the upper.

9. The fastener of claim 7, wherein the connection region includes a bore that extends through the shaft, and wherein the retainer is a pin selectively positionable within the bore when the bolt is received within the aperture.

10. The fastener of claim 7, wherein the connection region includes a groove that extends at least partially around the shaft, and wherein the retainer is a washer selectively positionable within the groove when the bolt is received within the aperture.

11. The fastener of claim 7, wherein the first non-metallic material is different that the second non-metallic material.

12. The fastener of claim 7, wherein the helical portion is flush with the top surface and is spaced apart from the bottom surface.

13. The fastener of claim 7, wherein a width of the helical portion changes from the first end to the second end.

14. A method of forming an enclosure for a utility, the method comprising:
    selecting a cover from a plurality of covers, wherein the selected cover is sized and shaped to fit within an opening of a corresponding flange;
    positioning a shaft of a bolt through a cover opening of the selected cover;
    connecting a non-metallic worm gear to the shaft of the bolt, the worm gear including a helical portion extending from the body of the worm gear, and the body of the worm gear being tapered and including a larger width proximate to the cover when connected to the bolt;
    selecting a retaining device from among a plurality of first retainers and a plurality of second retainers, each of the plurality of first retainers configured to be inserted through a bore of the shaft and each of the plurality of second retainers configured to be positioned in a groove of the shaft;
    connecting the selected retaining device to the shaft of the bolt to retain the worm gear along the shaft;
    positioning the selected cover at least partially within the opening of the flange to enclose a volume, the flange including a ledge for supporting the cover; and
    rotating the bolt and causing the worm gear to move from an unlocked position to a locked position;
    wherein the taper of the body permits the worm gear to interface with the ledge in the locked position with any of the plurality of covers and corresponding flanges.

15. The method of claim 14, wherein the shaft includes an asymmetrical shape, and wherein connecting the worm gear to the bolt further includes aligning the shaft with an opening through the body of the worm gear that includes a complementary asymmetrical shape.

16. The method of claim 14, wherein rotating the bolt a first angular distance causes the worm gear to rotate the first angular distance.

17. The method of claim 14, further comprising selecting the retaining device from both the plurality of first retainers and the plurality of second retainers.

18. The method of claim 14, further comprising replacing the selected retaining device with any of the plurality of first retainers and the plurality of second retainers previously unselected.

19. The method of claim 14, wherein the worm gear is constructed from polypropylene.

20. The method of claim 14, wherein the helical portion includes a larger width as measured from the body proximate to the cover when connected to the bolt.

\* \* \* \* \*